United States Patent [19]

Ristich

[11] Patent Number: 5,053,089
[45] Date of Patent: Oct. 1, 1991

[54] TIRE REPAIR PLUG

[76] Inventor: James Ristich, 294 Station Dr., Apt 1A, Wood Dale, Ill. 60191

[21] Appl. No.: 456,173

[22] Filed: Dec. 26, 1989

[51] Int. Cl.$^5$ .............................................. B29C 73/06
[52] U.S. Cl. ...................................... 152/370; 156/97; 156/337; 206/582
[58] Field of Search ..................... 152/370; 156/95, 97, 156/337; 206/582; 81/15.5, 15.7

[56] References Cited

U.S. PATENT DOCUMENTS

| | | | |
|---|---|---|---|
| 570,942 | 11/1896 | Merritt | 152/370 |
| 684,647 | 10/1901 | Madsen | 156/97 |
| 3,296,048 | 1/1967 | Wolfe | 152/370 |
| 4,096,901 | 6/1978 | Reichenbach | 152/370 |

Primary Examiner—Michael W. Ball
Assistant Examiner—Mark A. Osele
Attorney, Agent, or Firm—Paul H. Gallagher

[57] ABSTRACT

A unitary threaded plug for emergency tire repair is provided, of thermoplastic polymer composition, together with an optional pre-applied coating of uintaite asphalt as an integral adhesive and leak sealant to be activated by a small amount of waste oil from engine.

5 Claims, 1 Drawing Sheet

TIRE REPAIR PLUG

SUMMARY

I have invented a tire repair plug or device that constitutes an improvement over devices in this field heretofore existing. It has a unique tapered threaded shape that allows the motorist making the repair to use as little or as much of the material of the plug as needed.

Repair can be made either by hand or with commonly available tools. The device is suitable for use in punctures ranging from pinhole size up to half an inch across.

One of the objects of the invention is to provide a repair plug for making a quick repair to a tire in side-of-the-road self-rescue, without the need for removing either the tire or the rim from the vehicle. Even when no tool is at hand for driving the plug deep into the puncture, the user can make a temporary repair using finger pressure alone, safely sealing the leak until he can drive to where tools for a complete repair are at hand.

A further object of my invention is to provide a repair plug, the use of which is simply and easily understood and by which the repairs can be accomplished by persons of ordinary ability, with no special tools or training and only modest strength of hand and arm, and which is durable over the further life of the tire.

The drawing shows two particular forms of the unitary plug of the invention. The plug may be provided selectively without a coating, or with a coating, as will be disclosed below.

DETAILED DESCRIPTION

The unitary plug 1 is circular in cross-section and tapered over the majority of its length to the finest practical point, at 2, forming a body 3. The untapered portion 4 at the top, or driving end, forms a head that has a shallowly concave contour 5 of its lateral silhouette which gives easy purchase for fingers to screw the plug into the puncture by hand.

Figure 2:
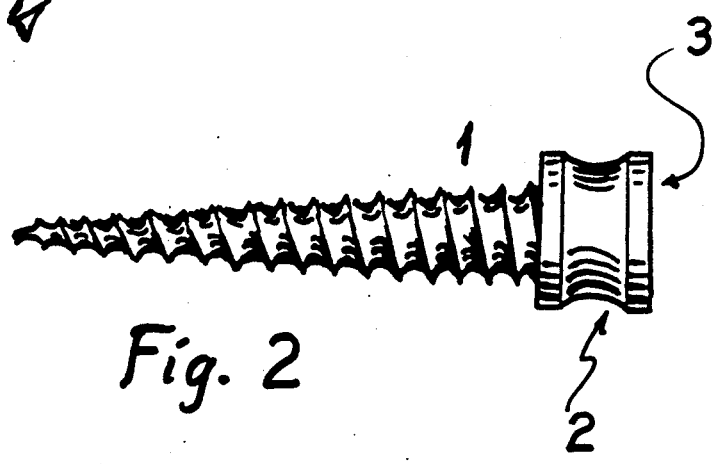
FIG. 2 is a lateral view of a variant form of the plug.

In the plug of FIG. 2, the larger (untapered end portion, or head, has a rather greater diameter than the maximum diameter of the tapered portion, or body, affording increased mechanical advantage for torque applied with the fingers alone and presenting a less easily deformable purchase for such gripping tool as might in the alternative be used to apply torque.

The flat surface 6 of the head 4 may be provided with a recess 7 shaped for engagement by a tool such as a phillips head screwdriver for screwing the plug in.

The plug itself may by fabricated of any of the usual thermoplastic polymers. An optional coating may be pre-applied in manufacture, as referred to below, so that the repair procedure may omit a separate adhesive application step.

If such a coating is to be provided, it is applied over the threaded surface of the body 3. Preferably the black lustrous variety of asphalt mined in Utah known as uintaite and sold under the trademark "Gilsonite", is utilized, this being prepared by mixing the asphalt in equal parts by volume with an organic solvent such as gasoline. After a short drying time, the coated plugs are ready for packaging and storage.

In the use of the device with the dry asphalt coating thereon, the coating can be re-softened by applying a small amount of oil, such as waste oil from the vehicle's engine.

Repairs made with this system enhanced by application of a moderate amount of rubber cement before insertion may be more leak-tight. However, the difference is only marginal. The object of the pre-applied coating, when used, is to provide means of safe self-rescue to the motorist, with a minimum of equipment and procedural steps.

The plug is used by screwing it into the puncture opening in the tire 8 to a satisfactory depth, and thereafter the user removes most of the excess material of the plug left protruding outside the tire carcass, either by nipping it off with side-cutter pliers, by cutting it off with a utility knife, or by heating it with a match or a butane lighter, enough to soften a portion near the tire tread surface, and then twisting off the remainder with finger force, in any case leaving about one-quarter inch of material protruding.

The plug may be extended through the steel belt 9 that is incorporated originally in the tire, but does not suffer damage therefrom, but is actually securely lodged thereby, because it may have undergone some deformation of its originally circular cross section.

Figure 1:
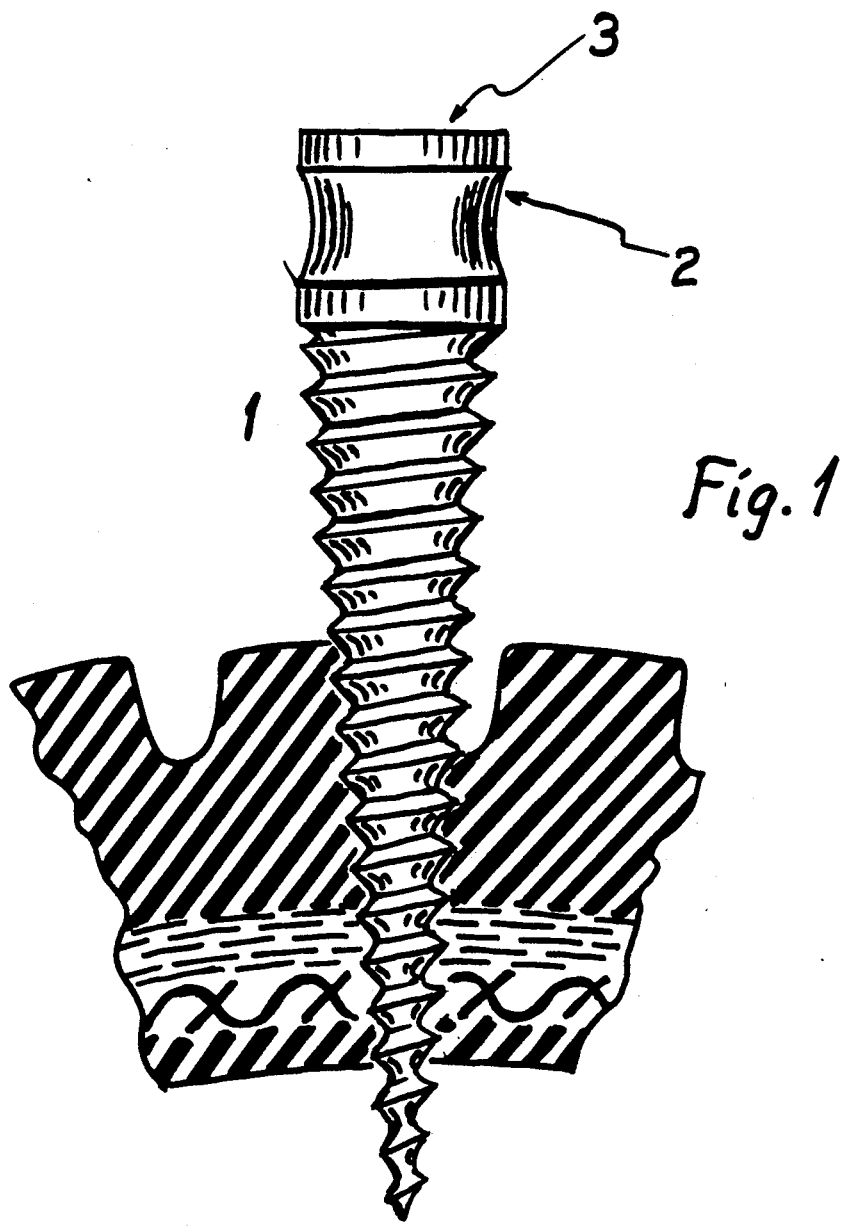
FIG. 1 is a lateral view of the plug, shown partially inserted in a tire, and before excess protruding material is removed, in a representative punctured tire tread to which the plug is applied.

In the realization of the invention, it is to be understood that both the devices of FIG. 1 and FIG. 2, and each selectively with or without the pre-applied coating, are within the broad concept of the invention.

I claim:

1. A tire repair plug for use in repairing a hole in a tubeless pneumatic tire, comprising,
   a body constituting the greater portion of the length of the plug, and tapered uniformly from a pointed end to a large end, the body being covered with a coating of petroleum-soluble material,
   a finger-gripper head at the large end of the body,
   the plug being capable of being threaded into the hole in the tire by manual force applied to the head, and the plug being of one piece and made entirely of plastic, and being separable into parts at any position along the length of the body, thereby, in the case of partial insertion of the body into the hole to any position less than complete insertion and leaving a part exposed exteriorly of the tire, enabling separation of the exposed part from the inner part that remains in the hole, and that inner part thereby constituting a plug effectively sealing the hole with an end positioned closely adjacent the outer surface of the tire.

2. A tire repair plug according to claim 1 wherein, the coating is of uintaite asphalt.

3. A method of repairing a tubeless pneumatic tire having a puncture hole therein, comprising the steps,
   (a) providing a uniformly tapered threaded plug with a finger-gripper head,
   (b) applying a petroleum-dissolved material to the plug and drying it to form a dry coating of such character as to enable the plug to be handled in commerce, and
   (c) applying the plug to the tire including the substeps,
      (1) softening the coating with petroleum, and (2) threading the plug into the hole while the coating is soft.

4. A method according to claim 3, wherein, step (b) is constituted by utilizing uintaite asphalt as said material to form the coating.

5. A method according to claim 4, wherein, step (c) (1) is constituted by utilizing motor oil to soften the coating.

* * * * *